United States Patent [19]

Sato et al.

[11] Patent Number: 4,991,030

[45] Date of Patent: Feb. 5, 1991

[54] IMAGE READING APPARATUS CAPABLE OF READING A PROJECTED IMAGE AND HAVING MEANS FOR DIFFUSING THE PROJECTED LUMINOUS FLUX

[75] Inventors: Hiroshi Sato, Yokohama; Michitaka Setani, Kawasaki; Kazuyuki Kondo, Kawasaki; Takeshi Kuwayama, Yokohama; Tokihide Ebata, Tanashi; Haruo Tsunoi, Yokohama, all of Japan

[73] Assignee: Canon Kabushiki Kaisha, Tokyo, Japan

[21] Appl. No.: 70,193

[22] Filed: Jul. 6, 1987

[30] Foreign Application Priority Data

| Jul. 7, 1986 | [JP] | Japan | 61-103985[U] |
| Jul. 25, 1986 | [JP] | Japan | 61-174983 |
| Aug. 9, 1986 | [JP] | Japan | 61-187436 |
| Nov. 6, 1986 | [JP] | Japan | 61-264208 |
| Nov. 17, 1986 | [JP] | Japan | 61-273507 |
| Nov. 17, 1986 | [JP] | Japan | 61-273508 |

[51] Int. Cl.⁵ .............................. H04N 1/04
[52] U.S. Cl. .................... 358/474; 353/494; 353/497
[58] Field of Search ............ 358/256, 285, 293, 294, 358/474, 487, , 497, 496, 494

[56] References Cited

U.S. PATENT DOCUMENTS

| 3,185,050 | 5/1965 | Huber et al. | 358/256 |
| 4,455,577 | 6/1984 | Tokuhara | 358/294 |
| 4,539,482 | 9/1985 | Nose | 358/293 |
| 4,636,062 | 1/1987 | Ohno et al. | 355/43 |
| 4,675,727 | 6/1987 | Sekizawa et al. | 358/75 |
| 4,696,552 | 9/1987 | Hattori et al. | 350/413 |
| 4,723,154 | 2/1988 | Kuwayama | 355/52 |
| 4,742,240 | 5/1988 | Yamanishi et al. | 358/293 |
| 4,751,584 | 6/1988 | Midorikawa | 358/285 |

FOREIGN PATENT DOCUMENTS

| 2116680 | 10/1972 | Fed. Rep. of Germany . | |
| 3432185 | 3/1985 | Fed. Rep. of Germany . | |
| 2569866 | 3/1986 | France . | |
| 56-24870 | 3/1981 | Japan | 358/293 |
| 59-15362 | 1/1984 | Japan | 358/293 |
| 59-168750 | 11/1984 | Japan . | |
| 59-228465 | 12/1984 | Japan | 358/293 |
| 60-77573 | 5/1985 | Japan | 358/293 |
| 60-240266 | 11/1985 | Japan | 358/293 |

OTHER PUBLICATIONS

Patent Abstracts of Japan, vol. 6, No. 37 (E-97)[915], Mar. 6, 1982 (Japanese Kokai 56-154868, Nov. 30, 1981).

Patent Abstracts of Japan, vol. 8, No. 17 (E-223)[1454], Jan. 25, 1984 (Japanese Kokai 58-178660, Oct. 19, 1983).

Primary Examiner—Edward L. Coles, Sr.
Attorney, Agent, or Firm—Fitzpatrick, Cella, Harper & Scinto

[57] ABSTRACT

An image reading device capable of reading a projected image has a lens array for forming an image from the projected light. Upbeam of the lens array is disposed a diffusion member which diffuses the luminous flux of the projected light. Preferably, a Fresnel lens is disposed to receive the projected light, and the diffusion member is a lower surface of the Fresnel lens which has been subjected to a surface-roughening treatment.

51 Claims, 17 Drawing Sheets

FIG.7
FIG.8
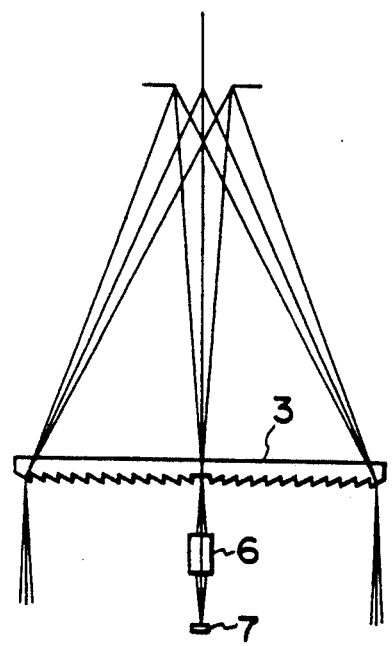
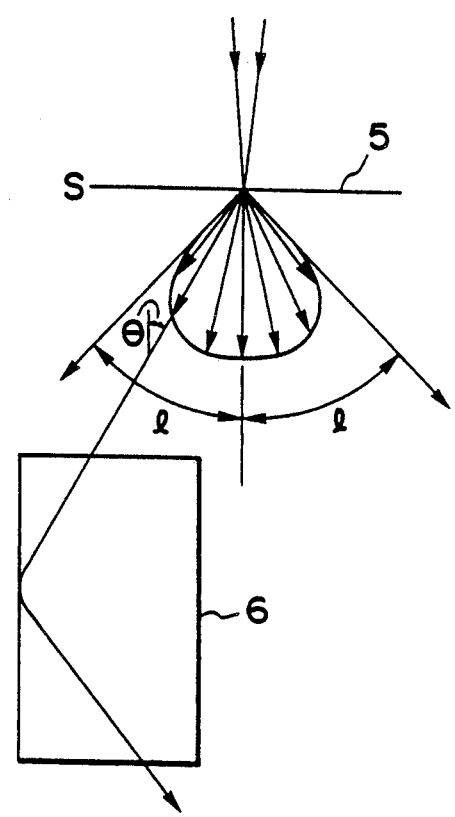

FIG.13A
FIG.13B
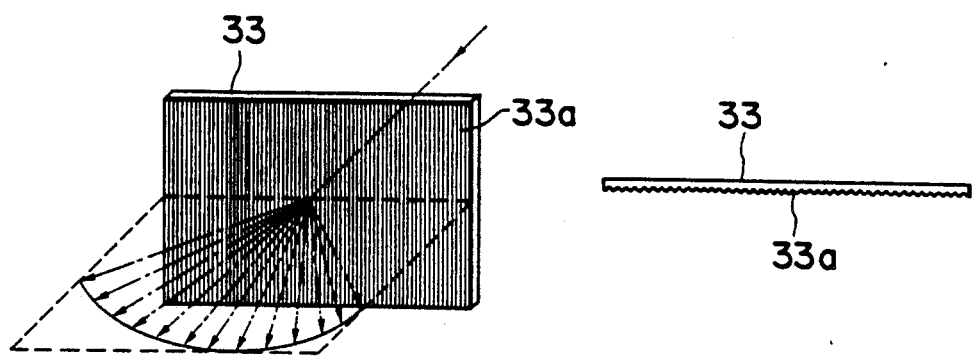
FIG.14
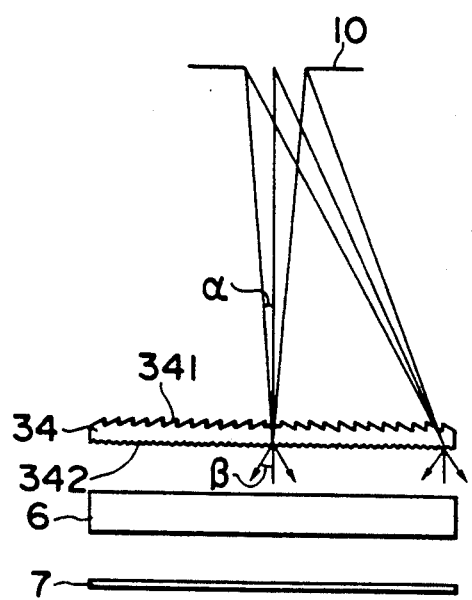

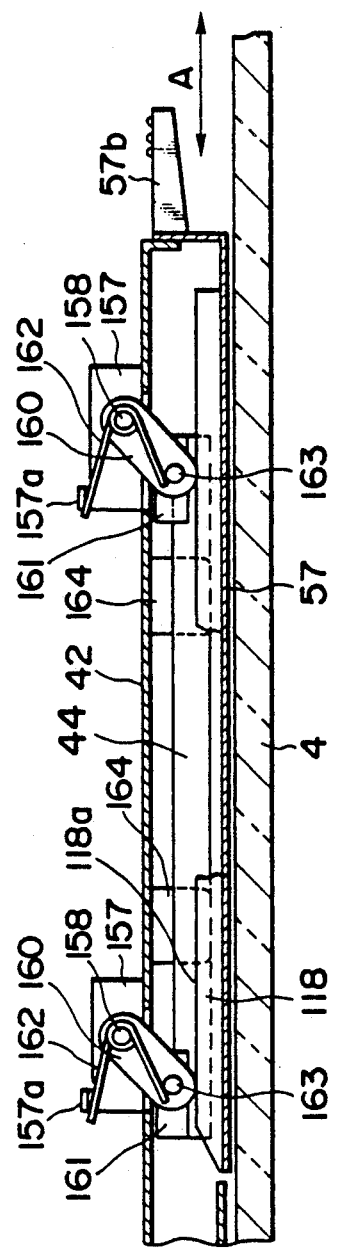
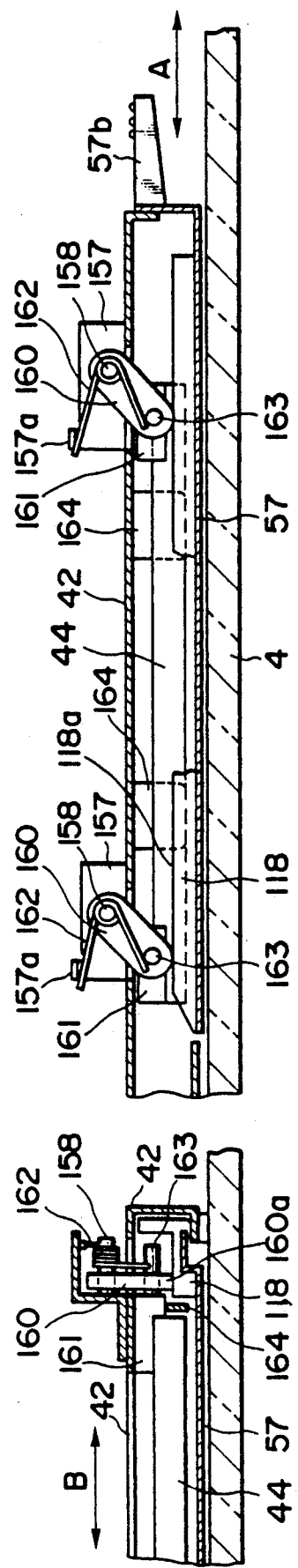
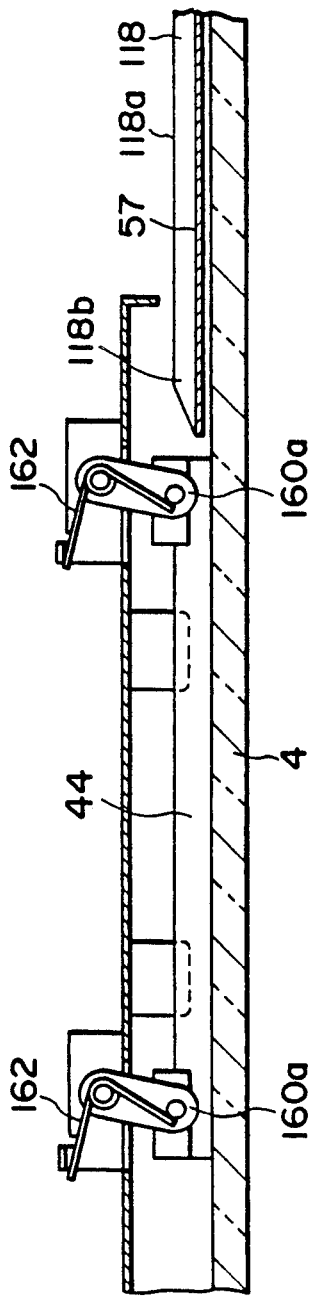
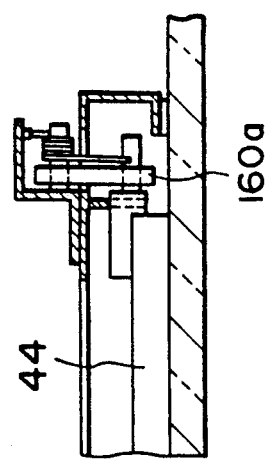

IMAGE READING APPARATUS CAPABLE OF READING A PROJECTED IMAGE AND HAVING MEANS FOR DIFFUSING THE PROJECTED LUMINOUS FLUX

BACKGROUND OF THE INVENTION

1. Field of the Invention

The present invention relates to an image reading apparatus which is capable of reading an image projected from a projector such as a film projector or a board surface projecting device, and more particularly to an image reading apparatus which uses a lens array as an image-forming optical system.

2. Related Background Art

In recent years, image reading apparatuses and copying machines have been developed that possess image readers that are capable of reading projected images obtained by transmitting or reflecting images on slide films, board surfaces, etc., in addition to reading images on documents placed on document mounting tables.

These apparatuses are very useful since they are capable of reading various types of images. In addition, in regard to image reading apparatuses, an attempt has been made to make the overall apparatus compact by using a lens array, particularly a short-focus image-forming element array.

However, when a lens array is used as an image-forming optical system for an image reading apparatus which is capable of reading a projected image from a projection section, in addition to a document placed thereon, the following problem is encountered.

FIGS. 1 and 2 show an apparatus in which a lens array is used. In the drawings, a document table glass 4 is fixed to an apparatus body A, and a movable image information reading unit 102 is disposed on the underside of the document table glass. The unit 102 is constituted by a document illumination lamp 121, a short-focus image-forming element array 6 (brandname: Selfoc), a solid image pickup element array 7 (an adhesive-type line sensor), etc. The unit 102 is guided into a guide by means of a drive mechanism (not shown), is moved from a home position on the left-hand side of the glass to the right-hand side along the underside of the document table glass 4 at a predetermined speed, and is returned to the home position when it reaches a movement terminating point.

If an enlarged projected image of a slide film or the like is to be read, a reflecting mirror 2, and a Fresnel lens 3 which imparts directivity to a luminous flux are disposed above the document table glass, as shown in FIG. 1, and an image is projected from a slide projector 10 disposed on the upper portion of the apparatus body A on the side thereof and formed on a focusing plate 8 via the reflecting mirror 2. After the image is focused accurately on the focusing plate 8 by adjusting the slide projector 10, the focusing plate 8 is pulled out, as shown in FIG. 2. Subsequently, a luminous flux is made to reach the image information reading unit 102, and, with the document illumination lamp 121 turned off, the projected image information is read by effecting scanning with the image information reading unit 102.

Thus, when a lens array is used as an image-forming optical system, it is preferred that an enlarged projection luminous flux is made incident upon a lens array after it has been converted into substantially parallel rays.

In the case of a copying machine, output signals thus read are transmitted to a laser beam printer, an ink jet printer, etc. incorporated in the image reading apparatus or provided separately, and are printed out. In the case of an image reader, the output signals are transmitted to a display, a memory storage device, or the like. In addition, in the case of a facsimile machine, the output signals are transmitted to a reception-side machine by means of a cable or radio.

If the lens array 6 is used as in this example so as to make the image information reading unit 102 of the body A compact and lightweight or so as to simplify the structure thereof, even if the position of the focusing plate 8 can be located within the depth of focus of the short-focus image-forming element array 6 by making the focusing plate 8 itself as thick as possible, the irregularity in the amount of light becomes large, which leads to the drawback that a uniform image cannot be obtained Next, the cause of this problem will be explained on the basis of the characteristics of a lens array, particularly a short-focus image-forming element array.

If a short-focus image-forming element array is used as the image-forming lens, the relationship of image-forming of one short-focus image-forming element becomes such as is shown in FIG. 3. In general, the overlap degree m of adjacent short-focus image-forming elements is expressed by the following formula:

$$m = \frac{X_o}{P} \qquad (1)$$

where $X_o$ is a radius of the field of view, and P is the pitch of short-focus image-forming elements.

FIG. 4 shows the relationships between the overlap degree m and the irregularity in the amount of light (unevenness in pitch) on the image surface. In FIG. 4, the element array comprises a plurality of rows of lenses. As is apparent from this drawing, the greater the degree of overlap, the smaller the degree of irregularity in the amount of light on the image surface.

However, if the effective focal aperture (F-number) on the magnifying side of a projection lens increases with a resultant reduction in the amount of light, and an expanding angle k of the projected luminous flux in FIG. 5 becomes smaller than the angle of field 0 of the lens, the luminous flux located outside the optical axis becomes eclipsed, and the radius of the field of view Xo virtually becomes small. As is apparent from the above formula (1), this causes the overlap degree m per se to decline. In other words, this leads to an increase in the irregularity in the amount of light on the image-forming surface.

SUMMARY OF THE INVENTION

Accordingly, a primary object of the present invention is to provide an image reading apparatus which is capable of reading with high precision an image projected onto a document mounting member.

Another object of the present invention is to provide an image reading apparatus which is capable of reading with high precision an image projected onto a document mounting member by the use of a lens array.

Still another object of the present invention is to provide a projecting device and an image receiving device for use in an image reading apparatus which is capable of forming a projected image at an optical high-precision position on a document mounting member.

The above and other objects, features and advantages of the present invention will become more apparent from the following description of the preferred embodiments thereof, taken in conjunction with the accompanying drawings.

To this end, according to the present invention, there is provided an image reading apparatus which is capable of operating in a first mode for reading an image of a document mounted on a document mounting table and in a second mode for reading an image located at a position different from that of the document mounting table, the apparatus comprising: a lens array for forming an image from image information light on ar image-forming section; and diffusion means which is adapted to diffuse a luminous flux and is used not in the first mode but in the second mode.

BRIEF DESCRIPTION OF THE DRAWINGS

FIG. 7 is a diagram illustrating optical paths;

FIG. 8 is an explanatory diagram relating to the present invention;

FIGS. 13A and 13B are diagrams illustrating still another embodiment of the present invention and constitute a perspective view and a cross-sectional view, respectively;

FIG. 14 is a schematic cross-sectional view of a further embodiment of the present invention;

FIGS. 30A, 30B, 31A, and 31B are diagrams illustrating another embodiment of the present invention.

DESCRIPTION OF THE PREFERRED EMBODIMENTS

Referring now to the accompanying drawings, descriptions will be given of the preferred embodiments of the present invention.

Figure 6:
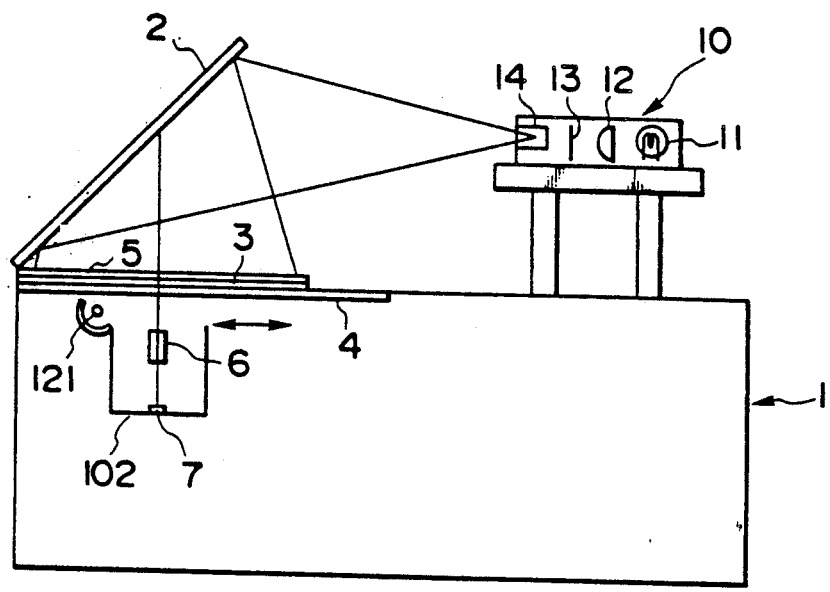
FIG. 6 is a cross-sectional view illustrating an embodiment of the present invention.

Incidentally, those members that appear in more than one drawing and perform the same functions are denoted by the same reference numerals FIG. 6 is a schematic diagram illustrating an embodiment of an image reading apparatus in accordance with the present invention. A projector 10 is provided on an image reading apparatus body 1, and an image receiving section having a reflecting mirror 2 and a Fresnel lens 3 are mounted on a document table glass 4. A projection light source 11, a lens 12, a slide film 13 which is a light-transmissive document, and a projection lens 14 are mounted in the projector 10. A lens array 6 which is a light-transmissive member of a short-focus, refractive index distribution-type is disposed in the body 1, as well as a line sensor 7 which is a reading means disposed downbeam from lens array 6. In addition, a film 5 which is provided with transmission and diffusion characteristics is mounted on the Fresnel lens 3 upbeam from lens array 6. As for this film 5, one in which the surface of a plastic film is provided with a matte finish by means of sandblasting may be used. Furthermore, the Fresnel lens 3 is designed to impart directivity to a luminous flux which expands in the direction of projection, as shown in FIG. 7, which shows the state of the luminous flux in a system with the reflecting mirror excluded.

As shown in FIG. 7, the projected and expanded luminous flux is converted into substantially parallel rays, these substantially parallel rays being made incident upon the lens array 6, and these incident rays of light forming an image on the line sensor 7.

The conversion of the projected light into parallel rays may be effected at least in the longitudinal direction of the lens, array,, as shown in U.S. Ser. No. 005,775, now U.S. Pat. No. 4,732,154, and need not be effected in the scanning direction (in the direction of the arrows shown in FIG. 6).

A description will now be given of cases where the projected image of the slide film 13 is read in the above-described arrangement. The light projected from the projection light source 11 passes through the lens 12 and illuminates the slide film 13, and the light from the illuminated slide film 13 is projected onto the document table glass 4 via the projection lens 14, the reflecting mirror 2, the film 5, and the Fresnel lens 3. The image projected onto the document table glass is further formed into an image on the line sensor 7 by means of the lens array 6 as in the case of the normal reflection-type document. As the reading unit 102 moves rightwardly as viewed in FIG. 6, the projected image is consecutively read in the form of slits.

In addition, when scanning the mounted document, the reflected light from the document forms an image on the line sensor 7 as the reading unit 102 moves with the illumination lamp 121 lit The image information read by this line sensor 7 is transferred to a printer section such as a laser beam printer (not shown) and is printed out.

Figure 1:
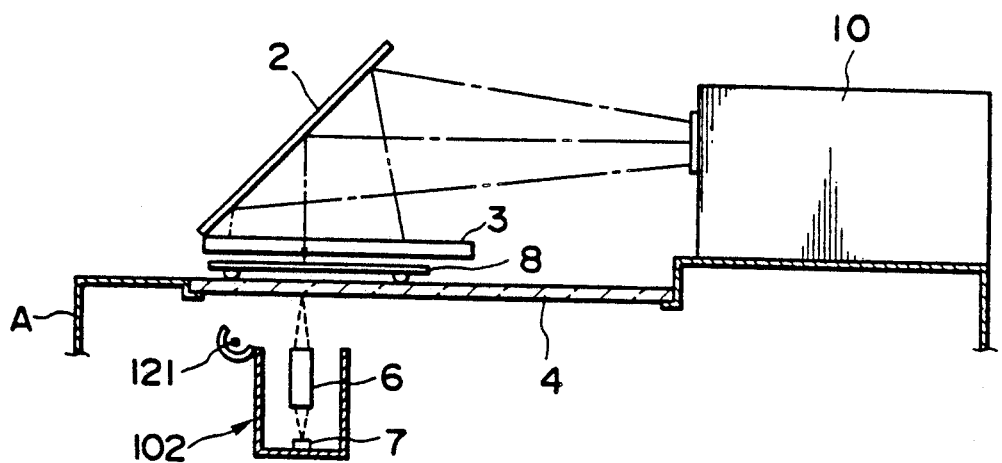
FIGS. 1 and 2 are cross-sectional views of an image reading apparatus which constitutes the technical background of the present invention.
Figure 2:
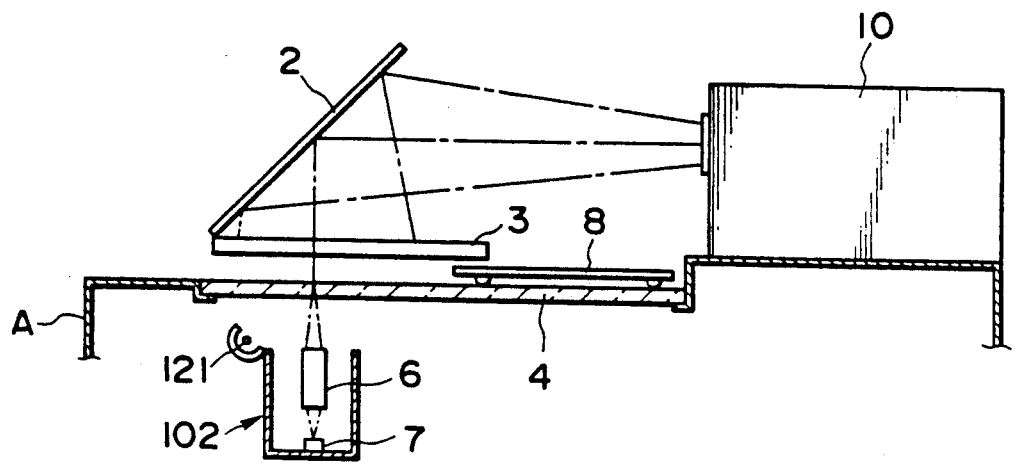
Figure 3:
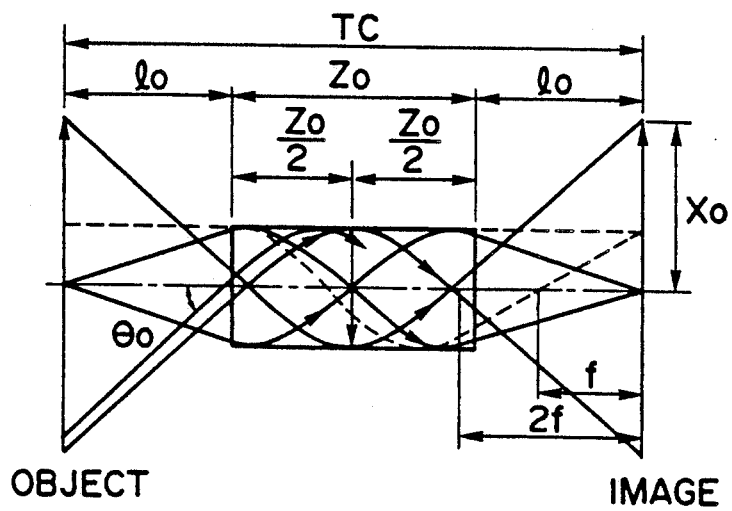
FIGS. 3, 4, and 5 are diagrams illustrating the problems of the apparatus shown in FIGS. 1 and 2.
Figure 4:
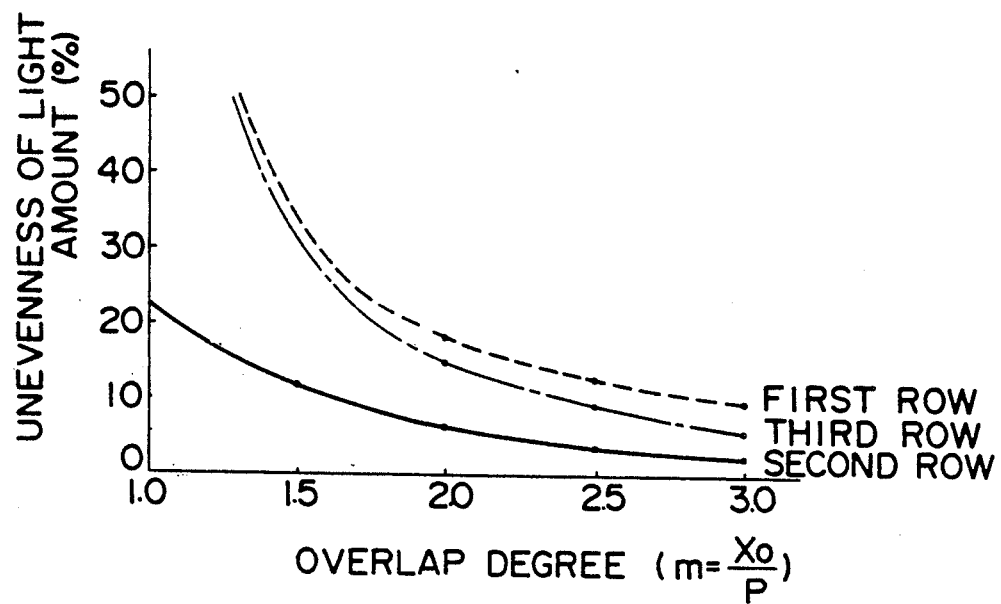

Next, FIG. 8 shows how a luminous flux expands when the film 5 having light diffusion characteristics is disposed on a projected-image-forming surface. As is apparent from the drawing the luminous flux in which an image is formed is diffused at an image-forming surface S, and an angle of expansion becomes 2 l. If this angle of expansion 2 l is greater than the angle of field $\theta$ of the lens array of the light-transmissive member of a refractive index distribution type, the luminous flux located outside the optical axis is also made incident upon the lens array 6 effectively without being excluded from the lens array 6. In addition, if a light-transmissive member of a refractive index distribution type is used for the lens array 6 to make the optical system compact, the relationship of image-forming of one light-transmissive member of the refractive index distribution type becomes such as is shown in FIG. 3, as described earlier. In general, the overlap degree m of a light-transmissive member of the refractive index distribution type can be expressed as $m = X_0/P$, where $X_0$ is a radius of the field of view, and P is the pitch of the light-transmissive member of the refractive index distribution type. In the above-described embodiment, the angle of expansion l of the projected luminous flux becomes greater than the angle of field $\theta$ by means of the film 5, so that the radius of field of view $X_0$ virtually becomes large. Consequently, the overlap degree m becomes high, and, as is apparent from the graph shown in FIG. 4, the irregularity in the amount of light can be reduced Incidentally, in the above-described embodiment, it is preferred that the film 5 is a material which has adequate diffusion characteristics (preferably, the angle of expansion l is equivalent to or greater than the angle of field $\theta$ of the light-transmissive member of the refractive index distribution type), as well as transmittance in the case of the transmissive type, or reflectivity in the case of the reflecting type.

In addition, although, in the above-described embodiment, a diffusive film is used as a means for diffusing the projected luminous flux, a similar diffusion effect can be obtained by subjecting the surface of the Fresnel lens 3 for imparting light directivity to the projected luminous flux to a suitable diffusion treatment, e.g., surface-roughening treatment such as sandblasting.

Thus, by subjecting the lens to surface-roughening treatment, the film 5 becomes unnecessary, which makes it possible to make the projection optical system further compact, effect a reduction in costs, and eliminate the possibility of the blurring of the projected image due to such as the warping of the film 5.

Next, another embodiment of the present invention will be described.

Figure 9:
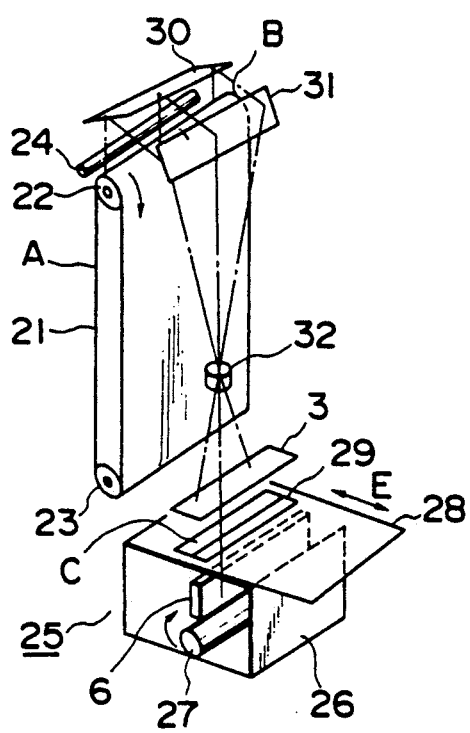
FIG. 9 is a diagram illustrating another embodiment of the present invention.
Figure 10:
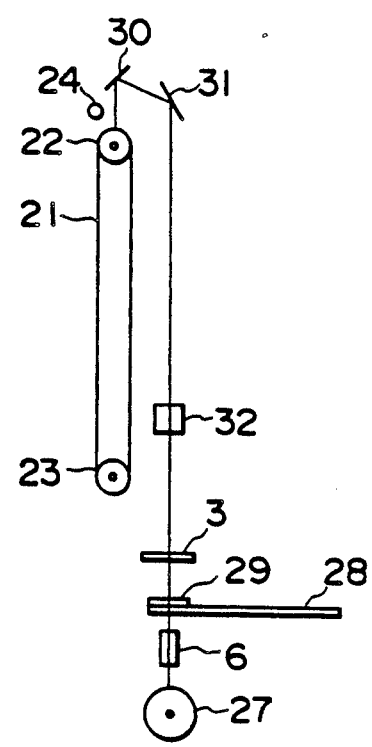
FIG. 10 is a cross-sectional view of the embodiment shown in FIG. 9.

FIG. 9 is a schematic perspective view of an embodiment of the present invention, while FIG. 10 is a schematic cross-sectional view of the embodiment shown in FIG. 9.

In the drawings, reference numeral 21 denotes a white or light-colored flexible board surface member, such as a synthetic resin belt of a wide width, which is capable of recording or erasing information with a writing instrument, and is stretched between rollers 22, 23. The board surface is substantially flat in the vertical direction, and is movable as the rollers 22, 23 are rotated in the direction of the arrow. The information written on this board is scanned, and is projected onto a photosensitive member by means of an optical system which will be described later. Desired information is written on a surface of the member 21 on the side shown by A, with an appropriate writing instrument The written information is illuminated with a lamp 24 at a position B on the opposite side to A by means of the rotation of the rollers 22, 23, and is scanned.

Reference numeral 25 denotes a copying-process section provided with an image reader section and has an electrophotographic sensitive member 27 which rotates inside a box 26 in the direction of the arrow. A photosensitive member charging device, a developing device, a transfer charging device, and a cleaner (which are not shown) are provided in the vicinity of the rotating path of the photosensitive member 27. Meanwhile, a means for supplying a transfer material to the position of the transfer charging device as well as a fixing device for fixing a toner image transferred onto the transfer material are respectively provided at predetermined positions. However, since they are well-known, description thereof will be omitted.

A movable document table 28 is mounted on top of the box 26. In a document copying mode, a manuscript to be copied, such as a document, is placed on this document table 28, and the table 28 moves in the direction of the arrow E which is substantially perpendicular to the moving direction of the member 21 so as to effect the scanning of the document. Upon completion of the scanning of the document, the table 28 returns to its home position. During the scanning of the document, ar image of the document placed on the table 28 is illuminated with an illumination lamp (not shown), and an image from the light reflected from the document is formed on the photosensitive member 27 by means of an image-forming optical system constituted by a convergent light-transmissive member array 6, so as to be exposed. This position of exposure is located between the photosensitive charging device and the developing device. Incidentally, the image-forming optical system effects the so-called slit exposure in which portions of an image of a document located at a position C which is fixed to the box 26 are consecutively formed on the photosensitive member 27.

On the other hand, in a board surface copying mode, a directional light-diffusing element 29 is disposed such as to be in contact with the document table 28 at the position C, and the Fresnel lens 3 is disposed thereabove in the vicinity thereof. However, in the mode of copying the document placed on the document table 28, the directional light-diffusing element 29 and the Fresnel lens 3 are at a position retreated from the aforementioned position, and are not involved during the scanning of the document placed on the document mounting table 28.

In the board surface copying mode, an image of the image information on the board surface illuminated with the lamp 24 at the position B is once formed on the document table 28, i.e., the directional light-diffusing element 29 abutting against it, via first and second mirrors 30, 31, an image forming lens 32, and the Fresnel lens 3. After obtaining a desired directional light-diffusing effect, this image is reprojected onto and formed on the photosensitive member 27 via the convergent light-transmissive member array 6.

A description will now be given of the effect of the Fresnel lens 3 and the directional light-diffusing element 29 with reference to FIGS. 11 and 12.

Figure 11:
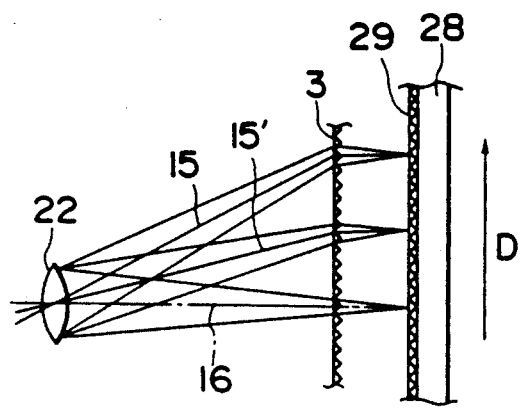
FIG. 11 is an enlarged view of essential portions of the embodiment shown in FIG. 9.
Figure 12:
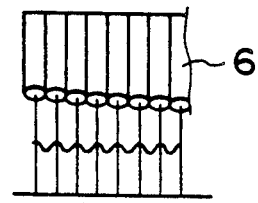
FIG. 12 is an explanatory view relating to the present invention.

The Fresnel lens 3 is an optical member which is designed to convert the directivity of rays located outside the optical axis and directed from the image-forming lens toward the document table 28' in a diverging manner into a perpendicular direction with respect to the document table 28 as practically as possible, as shown in FIG. 11. The Fresnel lens 3 is provided with saw-tooth projections and recesses on the surface of a flat plate in the shape of annular belts. The directional light-diffusing plate 29 further helps to direct the luminous flux emerging from the position C into the direction of arrangement of the element, thereby preventing the irregularity of the amount of light directed to the photosensitive member, in the same way as in the embodiment shown in FIG. 6.

In addition, this arrangement is preferred since, in this embodiment, the amount of rays of light made incident upon the lens array 6 becomes stabilized for each of the lenses because the light diffusing plate 29 is provided with directivity.

As for this directional light-diffusing plate, it is possible to use, for instance, a lenticular film or the like which is an optical member in which circular-arc-shaped projections having a very small coefficient of curvature are formed continuously on a flat plate in the aforementioned direction of arrangement.

Incidentally, it is preferred that, in terms of the image-forming performance, the light-diffusing plate is disposed within the focal depth of the lens array, and is particularly arranged such as to abut against the image-forming position, i.e., the document table 4. In this case, since the light-diffusing plate functions as a document, the situation is equivalent to that of the copying of a document. The image reader section is disposed with respect to the mounted document with high precision, so that high reading accuracy can be obtained at the time of the copying of the board surface as well.

Furthermore, in this embodiment, the diffusing plate is disposed downstream of the Fresnel lens which imparts directivity to the luminous flux. Since the diffusion coefficient declines when the diffused rays pass through the directional lens, the diffusing plate is preferably disposed downstream of the directional lens, such as the Fresnel lens.

Still another embodiment will now be described.

As described above, it is possible to overcome the irregularity in the amount of light on the image-forming surface by causing the projected luminous flux to be made incident upon the lens array after it is once diffused. However, the efficiency in the utilization of the light declines In other words, this embodiment is designed to enhance the efficiency of utilization of light rays by imparting a desired diffusion coefficient in the direction in which diffusion is required (in the longitudinal direction of the lens array in the above-described case) and by decreasing or reducing to nil the diffusion coefficient in a direction perpendicular to the same.

FIGS. 13A and 13B show such a diffusing member.

This diffusing member 33 is a transparent sheet having fine protrusions 33a only in one direction, as shown in FIG. 13A. Its cross section is shown in FIG. 13B. If a projected luminous flux (beam) is applied to this diffusing member 33, the transmitted beam is diffused in the transverse direction, but is not diffused in the vertical direction, as shown in FIG. 13A.

Thus, it is possible to enhance the efficiency of utilization of the light by decreasing (or preferably by reducing to nil) the diffusion coefficient in a direction perpendicular to that requiring diffusion than the diffusion coefficient in said direction requiring diffusion.

A further embodiment of the present invention will now be described.

FIG. 14 shows a cross-sectional view of the embodiment.

A luminous flux emergent from an emergence pupil of the projector 10 is refracted on a Fresnel surface 341 on the upper surface of a Fresnel lens 34 and is thereby converted into parallel rays and is diffused on a diffusing surface 42 of the underside thereof, as shown in the drawing. In other words, the angle of expansion $\alpha$ on the expanding side of the projection lens is expanded on the diffusing surface, as shown by $\beta$ in the drawing, and assumes the relationship of $\beta > \alpha$.

Figure 5:
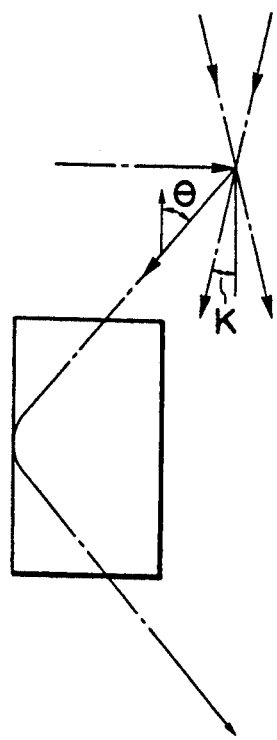

Accordingly, if the diffusing section is provided between the Fresnel lens section 341 and the lens array 6, the diffusion section is preferably such that the formula $\beta \geq \theta$ ($\theta$ is the angle of opening of the lens array; see FIG. 5) is met.

In addition, since the lens array-side surface of the Fresnel lens is subjected to diffusion treatment such as matte treatment, there is a cost-wise advantage, and the overall arrangement can be made compact in size.

Next, a description will be given of an image receiving device to which a still further embodiment of the present invention can be applied.

Figure 15:
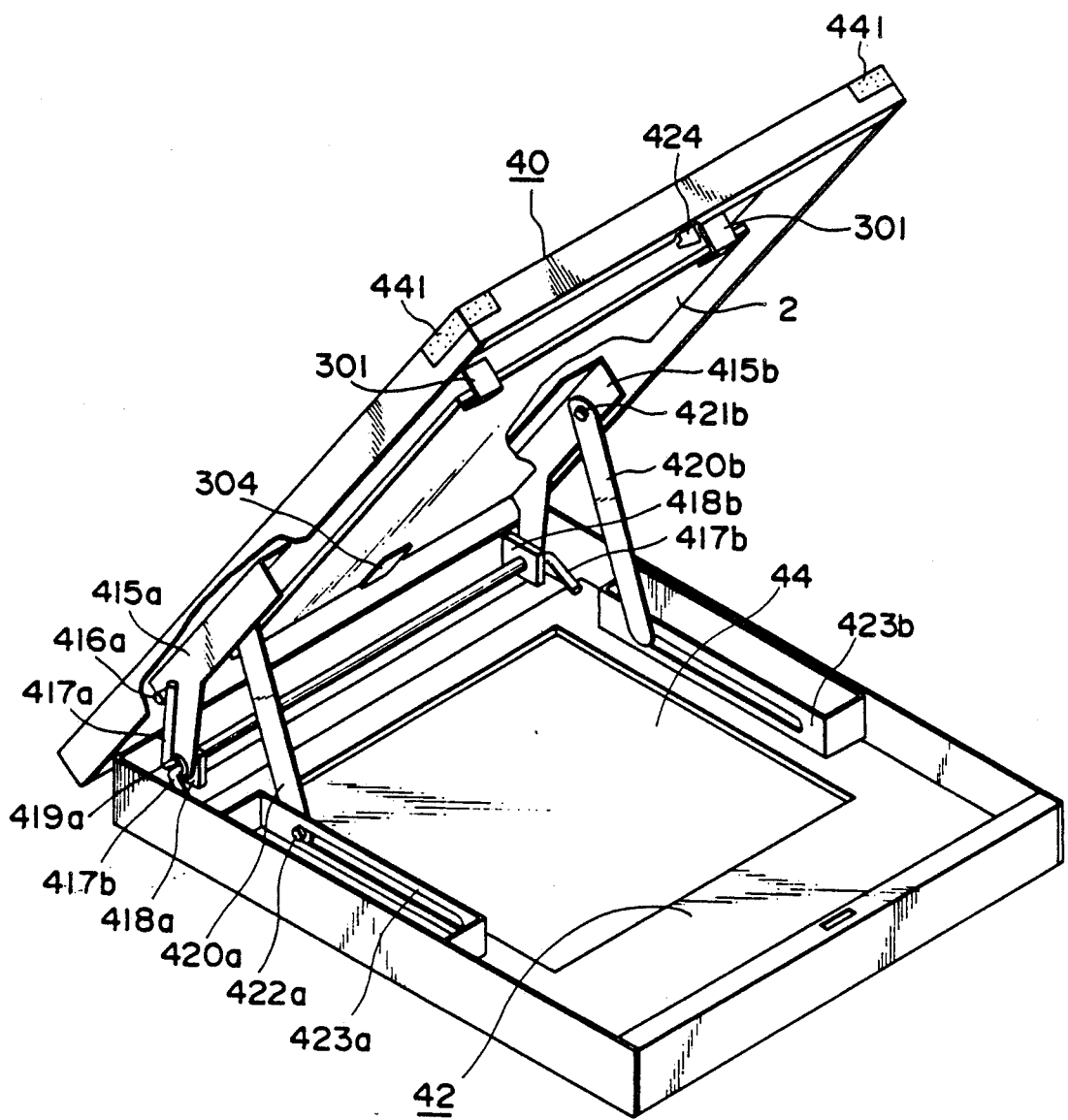
FIGS. 15, 16, and 17 are respectively a perspective view and a cross-sectional view illustrating a further embodiment of the present invention.

FIG. 15 is perspective view of a light receiving device which is adapted to receive a projected image from a projecting section and to which an embodiment of the present invention can be applied, this image receiving device being detachable with respect to the document mounting section of the image reading apparatus.

This image receiving device is arranged such that an upper frame 40 having the reflecting mirror 2 and a lower frame 42 having an image receiving plate 44 are openable relative to each other. When in use, the image receiving device is used with the upper frame open relative to the lower frame, as shown in the drawing.

An image projected from a projector (not shown) and reflected by the reflecting mirror 2 is led to the image receiving plate 44. The reflecting mirror 2 is fixed to the upper frame 40 by means of leaf springs 301, 304. The upper frame 40 is connected rotatably to the lower frame 42 via upper hinges 415a, 415b and lower hinges 418a, 418b. Reference numerals 420a, 420b respectively denote stays for holding the upper frame 41 and the lower frame 42 in the open state at a predetermined angle. On a end of each of the stays 420a, 420b is fixed rotatably on a fulcrum pin 421a (not shown) or 421b, while a slide pin 422a or 422b (not shown) is secured to the other end thereof. These stays 420a, 420b slide along elongated holes of guide rails 423a, 423b provided on the respective sides of the lower frame. At the hole portions of fulcrum dowels 19a, 19b (not shown) torsion bars 417a, 417b are disposed such as to penetrate therethrough. As pins 416a, 416b (not shown) provided on the hinge members 415a, 415b are hooked on the lower frame, thereby providing an urging force in the direction of increasing an angle formed between the reflecting mirror 2 and the image receiving plate 44.

By virtue of the above-described arrangement, if the length of the stays 420a, 420b is determined to an appropriate length, it is possible to constantly maintain the reflecting mirror 2 at a fixed angle.

Figure 16:
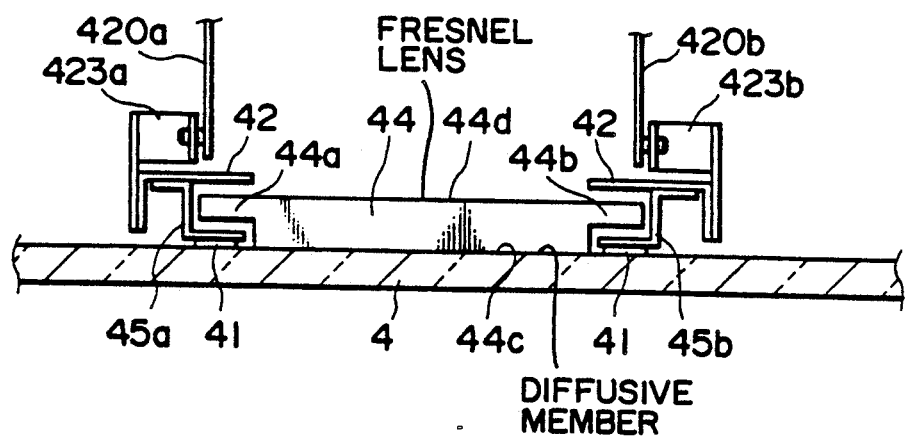
Figure 17:
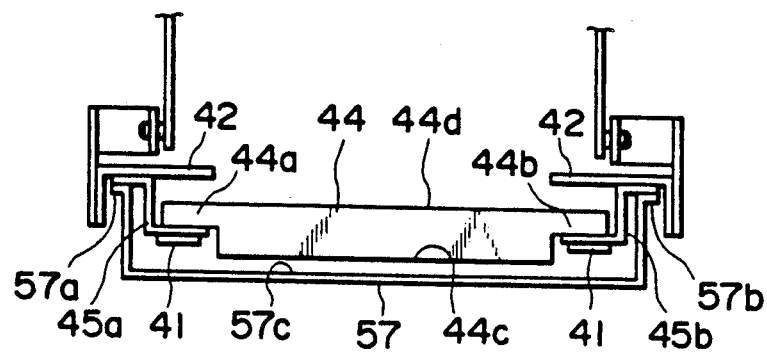

FIGS. 16 and 17 show an embodiment of the present invention which is applied to the image receiving device shown in FIG. 15.

As shown in FIG. 16, when in use, the optical image receiving member 44 on the plate is brought into close contact with the document table glass 4. The surface of this image receiving member 44 on the side abutting against the document table glass 4 of the image reading apparatus is formed as a transmissive and diffusive surface 44c, and the opposite surface as a Fresnel lens 44d. A projected image is formed on the diffusive surface 44c such as to be visually observable. Reference numeral 42 denotes the lower frame of the projected-image receiving device which is detachably provided on the image reading apparatus. The lower frame 42 is formed in the shape of a picture frame with a smaller opening than the image receiving plate 44. Reference numerals 45a, 45b respectively denote supporting members for the image receiving plate 44, and these supporting members 45a, 45b are adapted to restrict the movement of the image receiving plate 44 in the transverse direction in the drawing, and are secured to the frame 42 such as to support the image receiving plate 44 with a gap that will allow stepped portions 44a, 44b at opposite ends of the image receiving plate 4 to be movable in the vertical direction in the drawing. The arrangement is such that when the stepped portions 44a, 44b are brought into contact with the supporting members 45a, 45b, the diffusive surface 44c of the image receiving plate 44 becomes lower than rubber legs 41 respectively secured to the supporting members 45a, 45b. Therefore, if this projected-image receiving device is installed on the document table glass 4, the diffusive surface 44c of the image receiving plate 44 is brought into close contact with the document table glass.

As described above, since the arrangement is such that the image receiving plate 44, which is a projected-image receiving member, is brought into close contact with the document table glass 4, the situation at the time of reading a projected image becomes substantially identical with that in the case of reading an ordinary reflection-type document. Consequently, it is possible to positively read a projected image made incident from outside the image reading device, only by setting the optical arrangement of the device only with regard to the case of reading a reflection-type document. Furthermore, in this embodiment, the transmissive and diffusive surface 44c is provided, a projected image is formed thereon, and this diffusive surface 44c is brought into close contact with the document table glass 4. Therefore, it is possible to create a state which is identical with a case in which an ordinary reflection-type document is placed on the document table glass, regardless of the thickness of the projected-image receiving member itself. Hence, it is possible to further enhance the reading accuracy of the projected image. Since the projected image becomes observable by virtue of this diffusive surface 44c, it is possible to accurately focus the image on the document table glass by making use of this visual image. Hence, it is possible to prevent the deterioration in the read image due to the offset of focus resulting from the thickness of the focusing plate as well as the irregularity in the optical precision of the focusing plate with respect to the reading device, as has been experienced in the past. Furthermore, since the image receiving plate 44, which is a projected-image receiving member, is made movable in the direction of the luminous flux with respect to the lower frame 2, the image receiving member 44 can be held stably in close contact with the document table glass 4 regardless of the variation in the installing accuracy of the image receiving member with respect to the body of the projected-image receiving device. In addition, it is possible to further ensure the close contact between the image receiving member 44 and the document table glass 4 by inserting a resilient member, such as a leaf spring, between the projected-image receiving member 44 and the lower frame 42 and by pressing the image receiving member 44 against the document table glass 4. In this case, it is desirable to insert resilient members at the four corners of the image receiving member 44.

FIG. 17 shows a state of the projected-image receiving device when not in use. Reference numeral 57 denotes a protective cover for the image receiving plate 44. This protective cover 57 is arranged such that, when portions 57a, 57b are brought into contact with the supporting members 45a, 45b, the surface designated at 57c forms a gap with the diffusive surface 44c of the image receiving plate 44. Accordingly, when the projected-image receiving device is removed from the document table glass 4 of the image reading apparatus, it is possible to prevent the occurrence of damage to, or adhesion of dust on, the diffusive surface 44c of the image receiving plate 44 by providing this protective cover 57. Moreover, since a gap is created between the protective cover 57 and the diffusive surface 44c of the image receiving plate 44, it is possible to prevent the occurrence of damage to the image receiving plate 44.

A description will now be given of the most preferable embodiment of the present invention.

Figure 18:
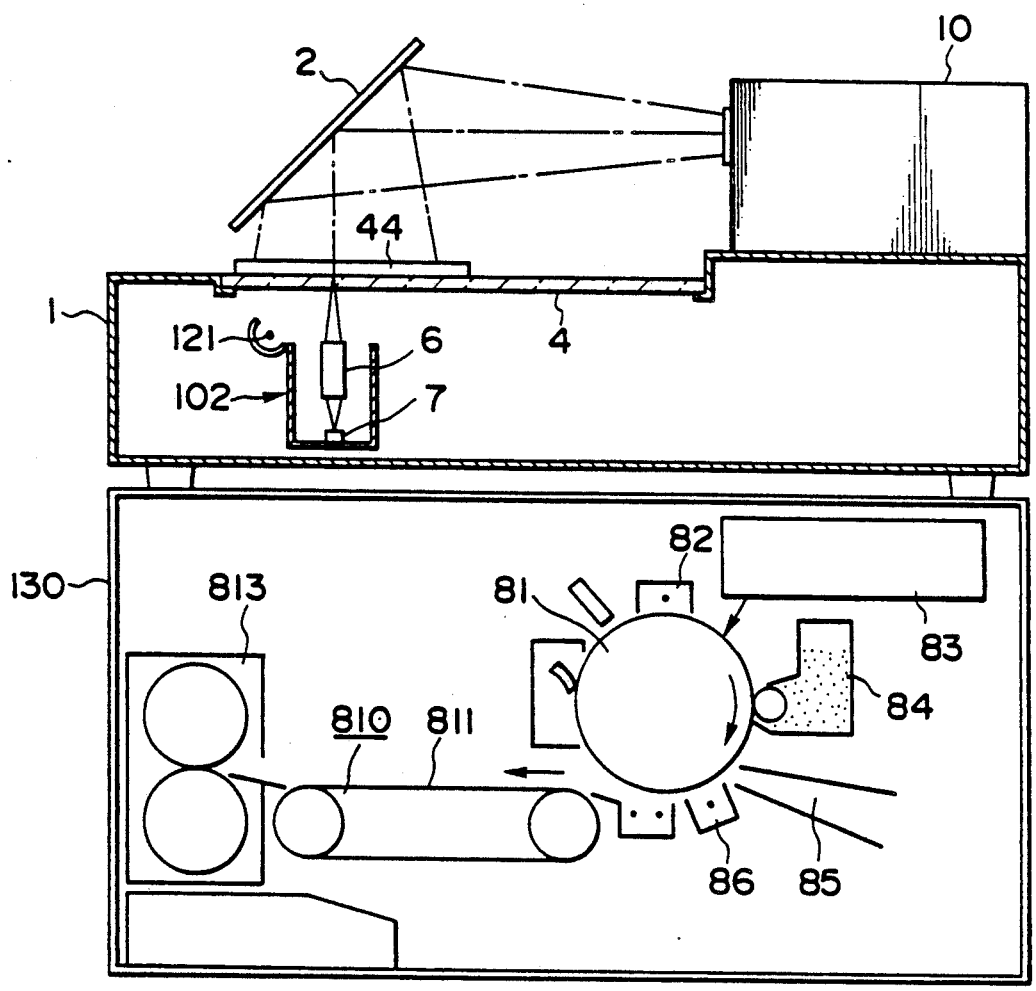
FIG. 18 is a cross-sectional view of a copying machine to which the present invention can be applied.

FIG. 18 is a cross-sectional view of a copying machine to which an embodiment of the present invention is applicable.

Since the image reader section is the same as that shown in the embodiment of FIG. 6, description thereof will be omitted.

In the drawing, reference numeral 102 denotes the movable image information reading unit disposed below the document table glass 4; 6, the short-focus image-forming element array; and 7, the solid image pickup element array. In addition, reference numeral 130 denotes a printer section; 81, a photosensitive drum; 82, a primary charger; and 83, a laser driver unit which incorporates a laser beam source for emitting a laser beam modulated on the basis of an output signal from the solid image pickup element array as well as a polygon mirror or the like for deflecting the laser beam emitted from the laser beam source. Numeral 84 denotes a developing device; 85, a paper guide; 86, a transfer charger; 810, a conveying unit; 811 a conveying belt; and 813, a fixing device.

Because of the above-described arrangement, an image projected from the projecting section 10 is received by the solid image pickup element array 7 via the reflecting mirror 2 and the image receiving plate 44 of the projected-image receiving device in accordance with this embodiment, and can be obtained as a copy image by means of a known process.

Figure 19:
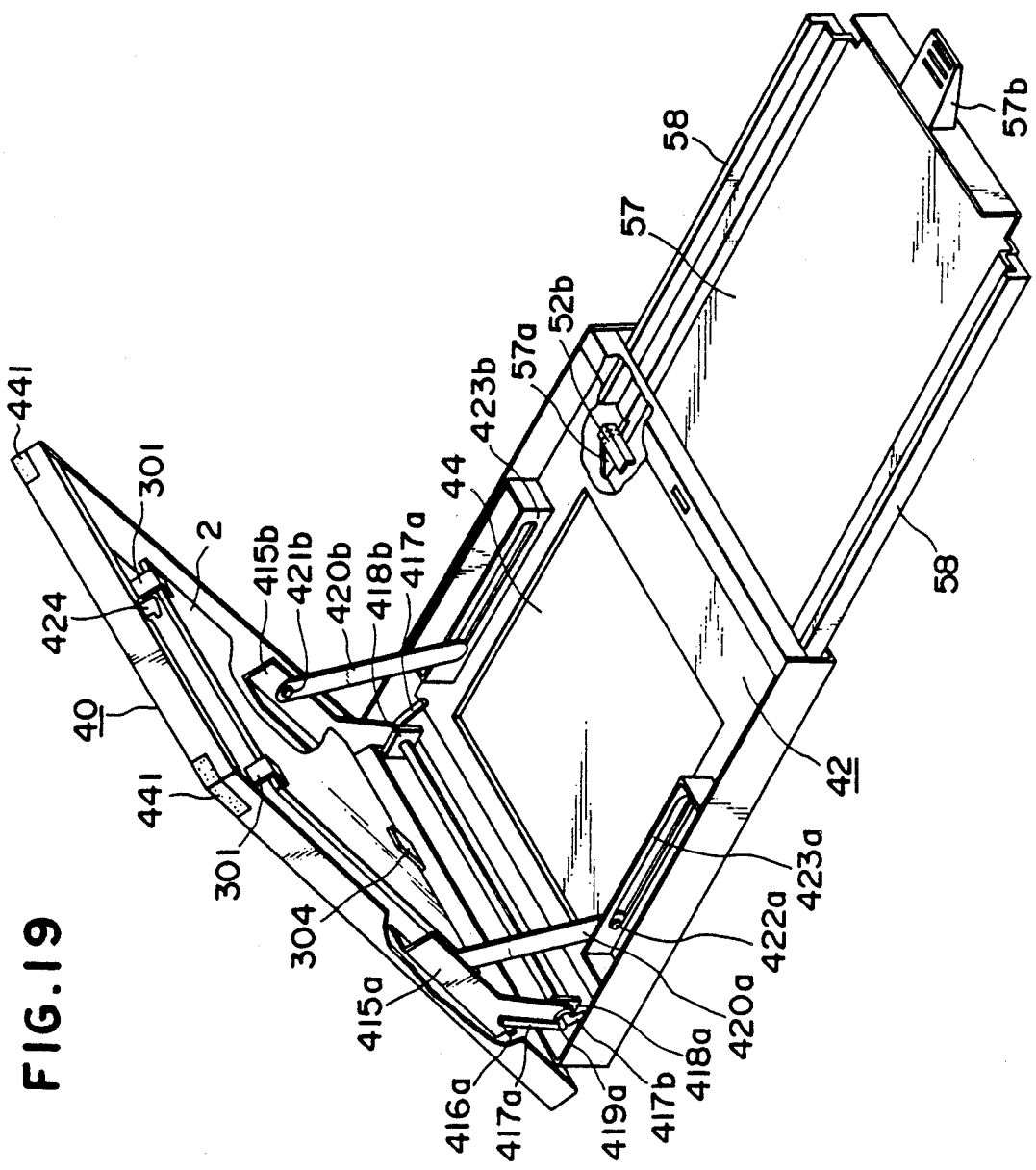
FIGS. 19, 20, 21, 22, 23, 24 and 25 are perspective and cross-sectional views illustrating a further embodiment of the present invention.
Figure 20:
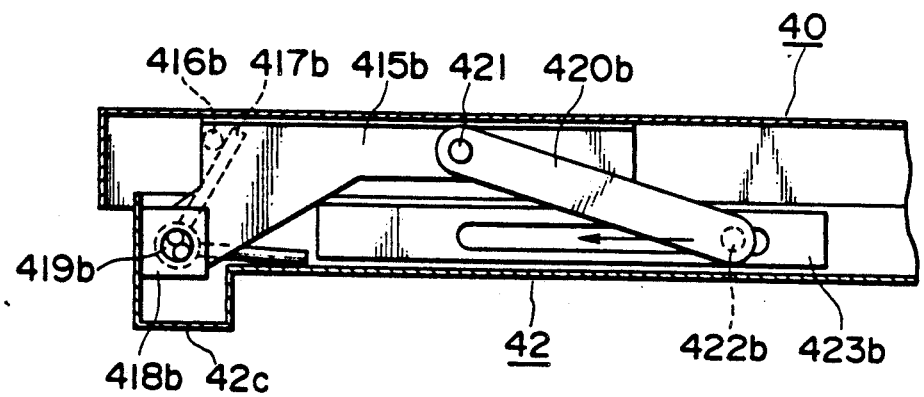
Figure 21:
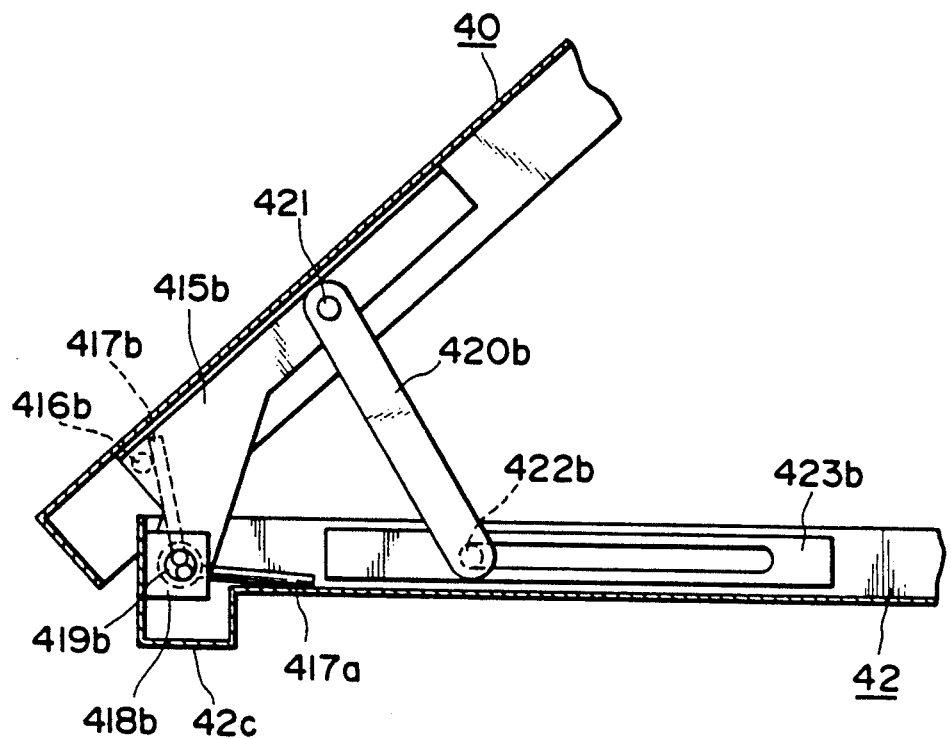
Figure 22:
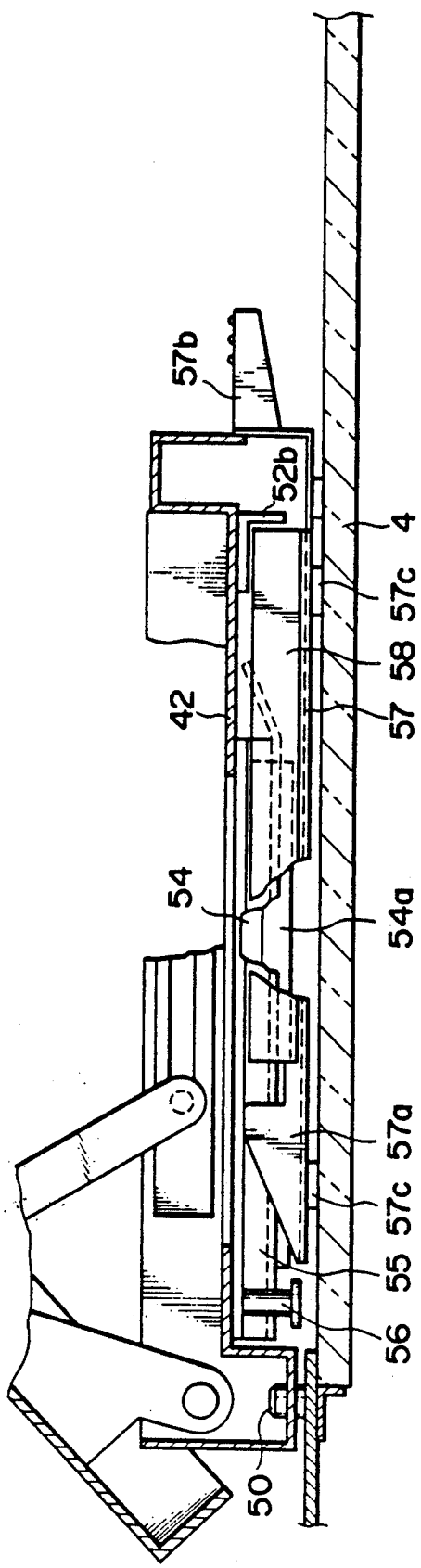
Figure 23:
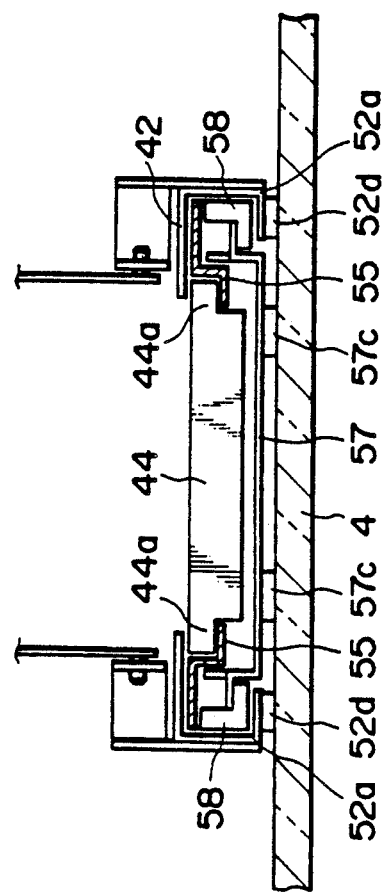
Figure 25:
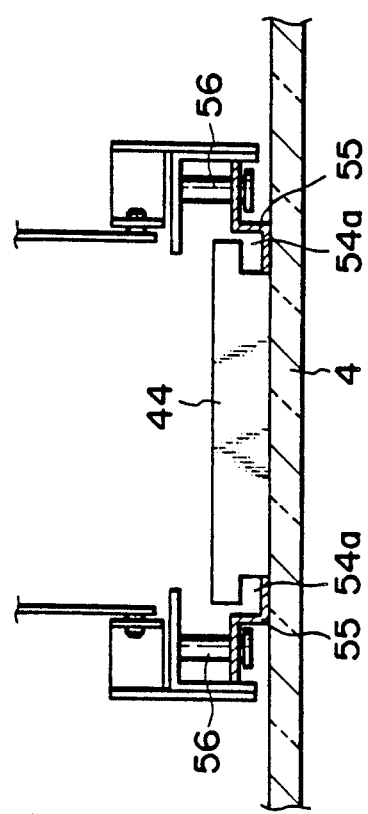
Figure 26:
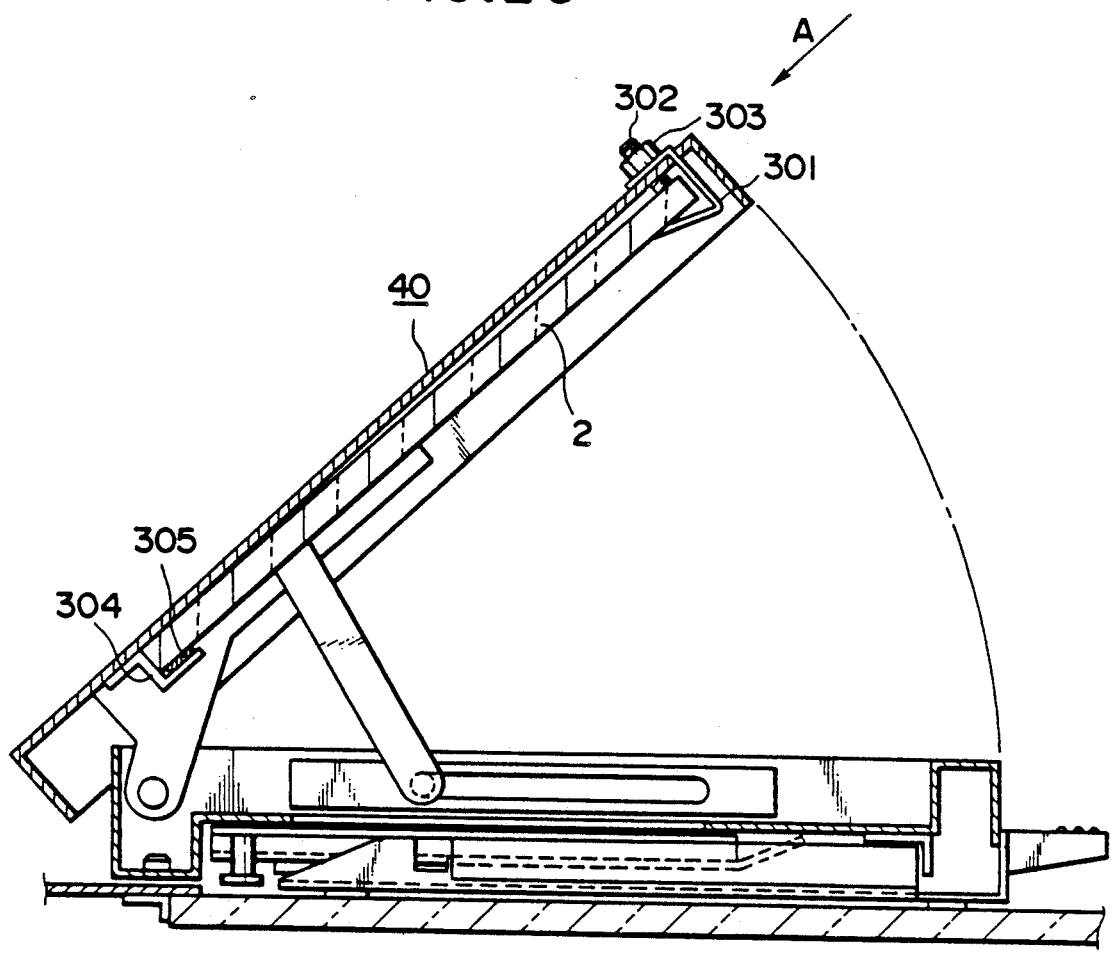
FIGS. 26 and 27 are cross-sectional views illustrating how a mirror in accordance with an embodiment of the present invention is supported, FIG. 27 being a cross-sectional view of FIG. 26 as viewed in the direction of the arrow A.

FIG. 19 is a perspective view illustrating a further embodiment of the image receiving device in the open state in accordance with the present invention; FIG. 20 is a cross-sectional view of essential portions thereof illustrating the closed state of the upper frame; FIG. 21 is a cross-sectional view of the essential portions thereof illustrating the open state; and FIG. 22 is a cross-sectional view of the essential portions illustrating the closed state of the lower cover. FIG. 23 is a cross-sectional view of essential portions illustrating a state in which the lower cover has been withdrawn (the state of FIG. 19), while FIG. 25 is a horizontal cross-sectional view thereof. FIG. 26 is a cross-sectional view illustrating how the mirror is supported, and FIG. 27 is a horizontal cross-sectional view of FIG. 26.

Figure 24:
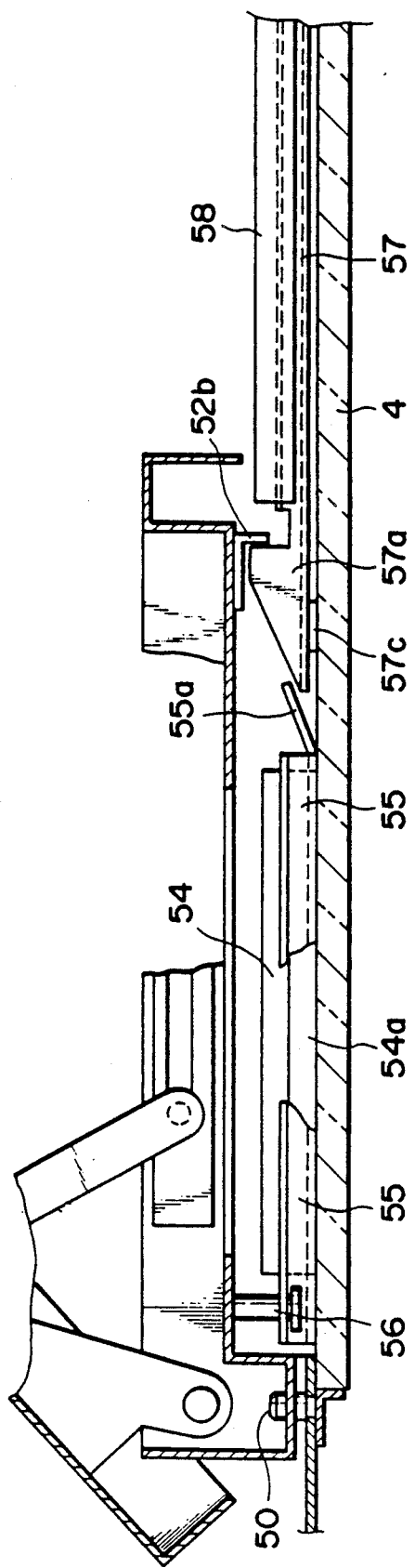

In FIGS. 19 to 25, reference numeral 44 denotes a planar optical image-receiving member, a surface thereof on the side abutting against the document table glass 4 being formed as a transmissive and diffusive surface, and the opposite surface being formed as a Fresnel lens. This image receiving member 44 is arranged in the same way as that shown in FIGS. 16 and 17. As shown in FIGS. 23, 25, the image receiving plate 44 has the stepped portions 44a on opposite sides thereof, and is supported in such a manner as to be placed between the lower cover 57 and the lower frame 42 which restricts the upward movement of the image receiving plate when the lower cover 57 is closed and is constituted by a picture frame-shaped frame member having supporting plates 55 for supporting the image receiving plate and an opening smaller than the supporting plates. As shown in FIGS. 22 and 24, the supporting plate 55 is supported by the lower frame 42 such as to be movable in the vertical direction, i.e., in the direction of the luminous flux, by means of a stepped screw 56. Reference numeral 57 denotes the lower cover for protecting the image receiving plate from becoming damaged or stained when the image receiving device is removed from the image reading apparatus, and sliding members 58 for guiding the movement of the lower cover are secured to the opposite sides thereof. These sliding members 58 and tip portions 57a of the side plates of the lower cover 57 are respectively inserted into guide rail portions 52a of the lower frame 42 in a state in which the image receiving plate 44 is lifted together with the supporting plates 55, as shown in FIG. 23. There are cases where the lower cover 57 is withdrawn up to a position where the tip portions 57a are brought into contact with the portions 52b, as shown in FIG. 24. At this juncture, the ends of the tip portions 57a are located below bent-up portions 55a of the supporting plates 55. As a result, the engaging relationship between the tip portions 57a and the portions 55a is not broken when the lower cover 57 is inserted. Reference numeral 57b denotes a knob for inserting or withdrawing the lower cover 57.

Figure 27:
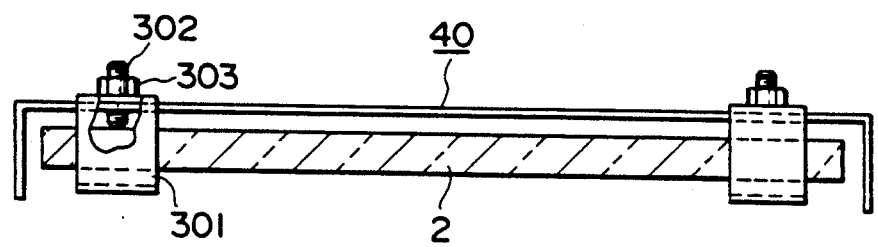

In FIGS. 26, 27, and 19, reference numeral 2 denotes the reflecting mirror, and is supported by the upper frame 40 having an opening on the side of the reflecting surface of the reflecting mirror such as to be supported at three points with the lower end of the reflecting mirror 2 supported by a hook 304 secured to the upper frame 40 and a resilient member 305 and with the upper two points thereof supported by U-shaped leaf springs 301. Furthermore, it is possible to adjust the installation angle of the reflecting mirror 2 by means of two setscrews 302 provided on the leaf springs 301. Since this adjustment side is resiliently urged by the leaf springs, no play is created. Reference numeral 303 denotes a nut for securing the setscrew 302. FIG. 27 is a diagram as viewed from the arrow A in FIG. 26. Reference numeral 52c is a pin hole for positioning with respect to the body of the image forming device. In addition, reference numeral 52d denotes a rubber leg of the lower frame, while numeral 57c denotes a leg formed of a Delrin material for improving the sliding characteristics of the lower cover.

Reference numeral 424 denotes a lock claw for retaining the upper frame 40 and the lower frame 42 in the closed state. With respect to the locking mechanism, a more detailed understanding can be obtained from Japanese Utility Model Laid-Open No. 168750/1984.

Figure 28:
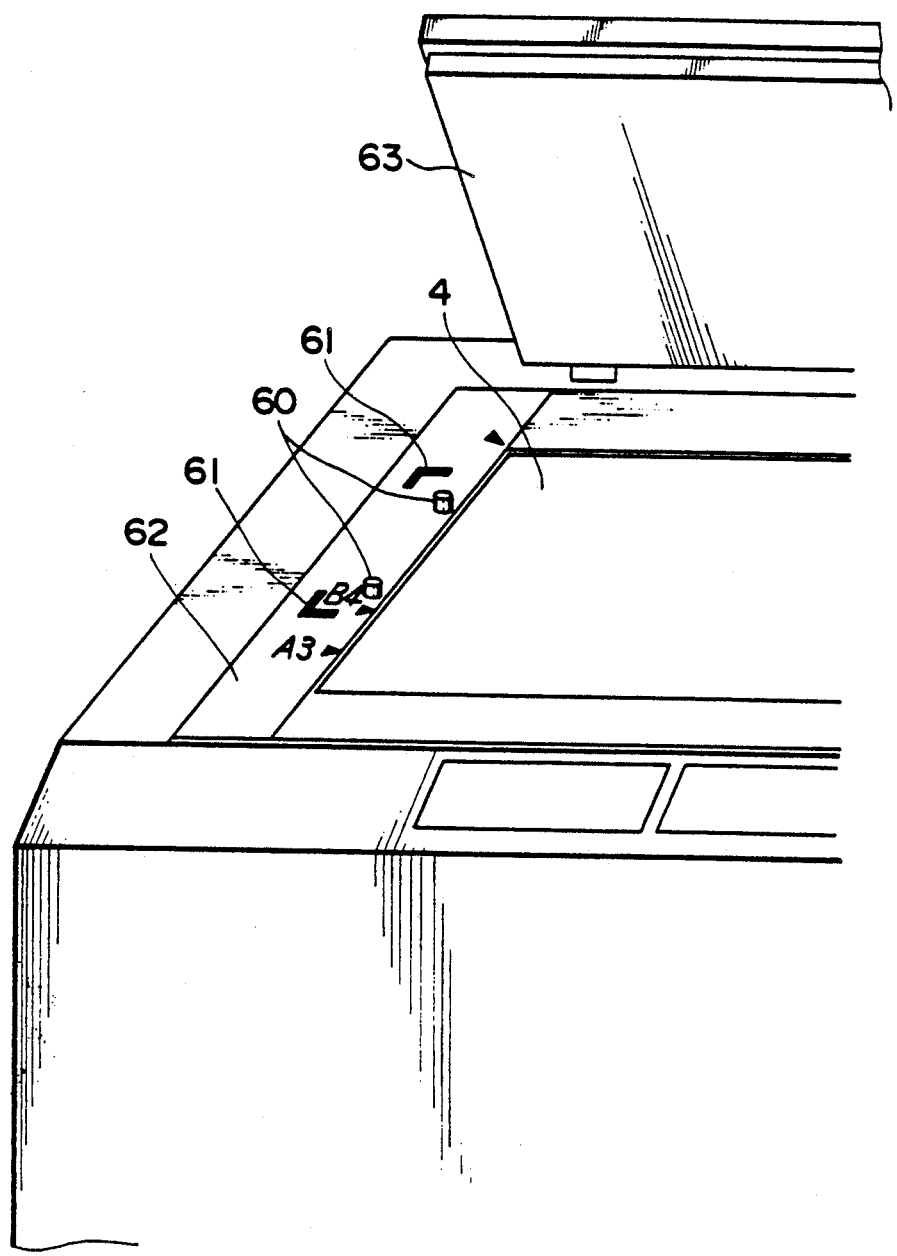
FIG. 28 is an enlarged view of essential portions illustrating a portion where an image receiving device of an image reader is installed.

FIG. 28 shows a part of an image reading apparatus in accordance with the present invention which is provided with an image forming section in which an image receiving device is detachable. In the drawing, dowels 60 for positioning the image receiving device are provided on a document butting index plate 62, as well as guide lines 61 conforming with the external configuration of the image receiving device when it is installed. The mounting operation can be effected smoothly by virtue of these guide lines for installation.

Figure 29:
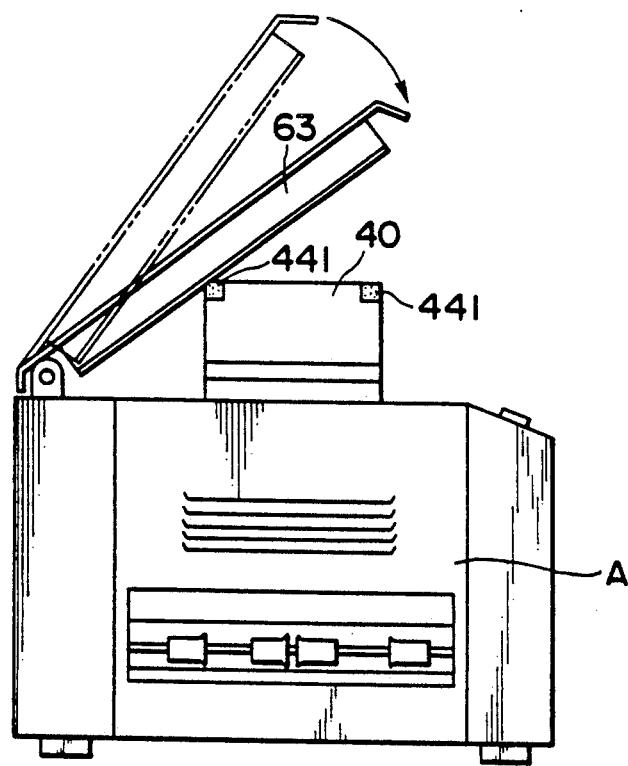
FIG. 29 is a diagram illustrating a state in which the image receiving device is installed in an image reading apparatus.

FIG. 29 is a left-hand side view of the image reading apparatus on which the image receiving device for receiving a projected image is mounted. Reference numeral 40 denotes an upper cover for the image receiving device, while numeral 441 denotes a cushioning material made of a soft rubber material and provided at the corners thereof. Numeral 63 denotes a document pressure-contacting plate of the image reading apparatus FIGS. 28 and 29.

Next, a description will be given of the operation of using this image receiving device.

When the image receiving device is not used, as shown in FIG. 20, since the image receiving section is covered with covering members on the upper and lower sides thereof, the image receiving device is protected from external damage, dust, and the like.

When the image reading apparatus is to be used with the image receiving deviced mounted thereon, the image receiving device is set on the document table of the image reading apparatus such as to assume a predetermined positional relationship. Subsequently, after the upper frame is opened, the operator withdraws the lower cover 57 by holding the knob 57b of the lower cover 57. Since the supporting plates 55 supporting the image receiving plate 54 are removed in an interlinking relationship with the opening movement of the lower cover along the sliding members 58 of the lower cover, the image receiving plate 54 together with the supporting plates 55 are lowered, and are brought into contact with the document table glass 4, as shown in FIGS. 24 and 25. Accordingly, if the focus of a projected image introduced in the direction of the image receiving plate 54 from the projecting section 10 is adjusted to the image receiving section, particularly the diffusive surface of the image receiving plate, it is possible to obtain a situation similar to the case where an ordinary document is placed on the reading device of the image reading apparatus.

In other words, in the image reading apparatus for reading a document, a reading optical system inside the apparatus is not provided with the position of the document as a reference. Therefore, by causing an projected image to be formed at the position of the document, the reading of the projected image becomes accurate.

In addition, since the image receiving section is brought into planar contact with the document table, no positional offset is created.

Furthermore, if the lower cover 57 is pushed in leftwardly as viewed in FIG. 24 in the state illustrated in said drawing, the tip portions 57c of the lower cover get under the bent-up portions 55a of the supporting plates 55 and scrape up the image receiving plate 44 together with the supporting plates, thereby allowing the same to be readily reset to the state shown in FIGS. 22 and 23. Accordingly, since the image receiving plate 44 is accommodated between the lower frame and the lower cover of the projected-image receiving device, once the upper frame is closed, there is no possibility of the image receiving plate 44 becoming affected by external damage, dust or the like. Thus, the projected-image receiving device can be detached readily from the main body and can be carried.

FIGS. 30A, 30B, 31A, and 31B illustrate another embodiment of the present invention FIG. 30A is a diagram in which an image receiving device is viewed from the same direction as that of FIG. 24; FIG. 30B is a diagram in which the embodiment shown in FIG. 30A is viewed in the same direction as that of FIG. 25; FIG. 31A is a diagram in which the embodiment is viewed in the same direction as that of FIG. 30A; and FIG. 31B is a diagram in which the embodiment is viewed in the same direction as that of FIG. 30B.

In the drawings, shaft bases 161 each have a round shaft 163 and are secured at the four corners of the image receiving plate 44. Shaft bases 157 each have a round shaft 158 and are fixed to the lower frame 42. A link 160 connects the round shafts 163, 158, and swingably suspends the image receiving plate 44 from the lower frame 42.

Each of torsion coil springs 162 has its end engaged at the portion 57a and the other end at the shaft 163 and serves to press the image receiving plate 44 toward the document table glass 4.

Sliding members 118 are respectively secured to the opposite sides of the lower cover 57, are fitted with the U-shaped guide portions of the lower frame 42 such as to be slidable, and are designed to facilitate the insertion and withdrawal of the lower cover in the direction of the arrows A. A portion 118a is at a position in which it is brought into contact with the lower portions 160a of the links 160.

Reference numeral 164 denotes a bent-up portion secured to the lower frame 42 and adapted to restrict the looseness of the image receiving plate 44 in the direction of the arrows B.

In the above-described arrangement, FIGS. 30A and 30B show a state in which the lower cover 57 is inserted into the lower frame 42, and since the portions 160a of the links 160 have run on the portion 118a, the image receiving plate is accommodated between the lower frame 42 and the lower cover 57.

FIGS. 31A and 31B show a state in which the lower cover has been withdrawn, and since the link portions 160a are separated from the portion 118a, the image receiving plate 44 is brought into close contact with the document table glass by means of the coil springs 162. This arrangement is preferable since the springs which are resilient members further improve the relationship of close contact.

Although, in this modification, the torsion coil springs 162 are provided to enhance the closecontact characteristics, it is apparent that an alternative arrangement may be provided such that, by eliminating these springs, the image receiving plate 44 is brought into close contact with the document table glass by its own weight.

Since if the lower cover is pushed in again in the state shown in FIG. 31A, the portion 118b gets under the portions 160a of the links 160 and push the same upward, the image receiving plate 4 is moved in the direction of separating away from the document table glass and is accommodated again between the lower frame 42 and the lower cover 57.

Although these sliding members are used in this embodiment, if the image receiving member is moved vertically by engaging such a cover per se, it is desirable since the overall apparatus can be made compact and the costs can be reduced as a result.

In addition, in order to interlink the movement of the cover member and the image receiving member in the direction of the optical axis, the image receiving member and the cover may be linked to each other by means of a wire, and the image receiving member may be moved by the opening and closing operation of the cover. Alternatively, by providing a microswitch in the traveling path of the image receiving member, a solenoid or the like may be driven on the basis of a signal from this microswitch so as to effect the movement of the image receiving member.

Although the embodiments of the present invention have been described above, it should be understood that the present invention should not be restricted to these embodiments and may include any modifications within the scope of the technical concept of the present invention which is solely defined in the claims appended hereto.

What is claimed is:

1. An image reading apparatus having a first operating mode wherein an original mounted on an original mounting plate is illuminated and light reflected from the illuminated original is read, and a second operating mode wherein an original not mounted on the original mounting plate is illuminated and light from the illuminated original is projected onto the original mounting plate and read, said apparatus comprising:
   a lens array for image-forming image information light at an image reading portion of the apparatus; and
   diffusion means for diffusing the light flux, the image light diffused by said diffusing means in the second mode being image-formed at the reading portion by said lens array and reading of the original is carried out.

2. An image reading apparatus according to claim 1, wherein said lens array is a short-focus image-forming element array.

3. An image reading apparatus according to claim 1, further comprising an image-forming section having a line sensor, said image-forming section being disposed downbeam of said lens array.

4. An image reading apparatus according to claim 1, wherein said lens array comprises a plurality of rows of lenses.

5. An image reading apparatus according to claim 1 further having projecting means for projecting the image information light on the original mounting plate in the second mode, said diffusing means being disposed in the projected light path between it and the original mounting plate.

6. An image reading apparatus according to claim 5, wherein said projecting means has a projection lens, said diffusion means being disposed between the projection lens and the original mounting plate.

7. An image reading apparatus according to claim 5, wherein said diffusion means comprises a film-like material.

8. An image reading apparatus comprising:
   a main body having a transparent original mounting member, said main body having an inside image reading portion whereat an image of an original mounted either on the original mounting member or elsewhere is to be formed to be read, and a lens array for forming an image of the original at the image portion; and projection means for projecting light from an original not mounted on the original mounting member onto the original mounting member, said projection means having a lens member for imparting directivity to the projected light, and diffusion means for diffusing the projected light, the projected light diffused by said diffusion means being image-formed at said image reading portion by said lens array, thereby carrying out reading of the original.

9. An image reading apparatus according to claim 8, wherein said diffusion means is disposed between said lens member and said original mounting member.

10. An image reading apparatus according to claim 8, wherein said lens member is a Fresnel lens.

11. An image reading apparatus according to claim 10, wherein said diffusion means comprises a roughened surface of the Fresnel lens.

12. An image reading apparatus according to claim 8, wherein said diffusion means is lenticular.

13. An image reading apparatus according to claim 8, wherein said lens member converts the light into substantially parallel rays of light.

14. An image reading apparatus according to claim 8, wherein said lens array is a short-focus image-forming element array.

15. An image reading apparatus according to claim 8, wherein the image reading portion comprises a line sensor.

16. An image reading apparatus comprising:
projection means for projecting light conveying image information;
scanning means for scanning the projected light from said projection means, said scanning means having (1) a lens array for forming an image from the projected light, and (2) an image reading portion for reading the image formed by said lens array, said lens array being arranged in a direction substantially perpendicular to a direction of scanning of said scanning means; and
diffusion means, disposed upbeam of said lens array, for diffusing the projected light, a diffusion coefficient of said diffusion means for the scanning direction of said scanning means being different from a diffusion coefficient of said diffusion means for a direction perpendicular to the scanning direction.

17. An image reading apparatus according to claim 16, wherein the diffusion coefficient of said diffusion means is greater in the direction perpendicular to the scanning direction than in the scanning direction.

18. An image reading apparatus according to claim 17, wherein said diffusion means diffuses the projected light only in the direction in which said lens array is arranged.

19. An image reading apparatus according to claim 16, further comprising a lens member, disposed upbeam of said diffusion means, for converting the projected light into substantially parallel rays of light.

20. An image reading apparatus which is capable of reading an image of a document mounted on a document mounting member as well as an image projected from a projection means, said apparatus comprising:
image receiving means having an image receiving member for receiving the projected image in a visually observable manner; and
a lens array for images-forming images information light on the reading portion; said image receiving means being used contacted with the original mounting member, when the projected image received by the image receiving member is read at the reading portion via the lens array.

21. An image reading apparatus according to claim 20, wherein said image receiving means has a diffusing member for diffusing the luminous flux, said diffusing member being used contacting with the original mounting member.

22. An image reading apparatus according to claim 21 wherein said image receiving means further has a lens member for making the projected luminous flux substantially into parallel light, the luminous flux thus made parallel light by the lens member being diffused by the diffusing member.

23. An image reading apparatus according to claim 22, wherein said lens member and diffusing member are provided integrally.

24. An image reading apparatus according to claim 23, wherein said diffusing surface is a roughened surface of said lens member.

25. An image reading apparatus according to claim 20, wherein said image receiving means further has a lens member which converts the projected image into an image having substantially parallel rays of light.

26. An image reading apparatus according to claim 20, wherein image receiving member is used for adjusting focusing of the projected image.

27. An image reading apparatus according to claim 20, wherein said lens array is a short-focus image-forming element array.

28. An image reading apparatus according to claim 20, wherein the image reading portion comprises a line sensor.

29. An image reading apparatus, comprising:
a main body provided with (1) a transparent document mounting member, (2) an image reading portion where an image of a document mounted on said document mounting member is formed to be read, and (3) a lens array, disposed between said document mounting member and said lens array, for forming the document image on said image reading portion; and
projection means, disposed upbeam of said document mounting member, for projecting luminous flux onto said document mounting member from outside said main body, said projection means having (1) a lens member for imparting directivity to the luminous flux, and (2) diffusion means for diffusing the luminous flux, said diffusion means comprising one surface of said lens member which is roughened.

30. A projecting device for projecting an image onto a document mounting section of an image reading apparatus which is capable of reading a document mounted on said document mounting section, said device being detachably mounted at a predetermined position on said image reading apparatus, comprising:
a lens member, disposed upbeam of the document mounting section, for imparting directivity to a projected luminous flux, said lens member comprising a Fresnel lens; and
a diffusing member, disposed downbeam of said lens member, for diffusing the projected luminous flux, said diffusing member being obtained by subjecting a surface which is on a flat side of said Fresnel lens to a surface-roughening treatment.

31. An image receiving device for receiving an image projected along an optical axis from a projecting means, comprising:
an image receiving member for receiving the projected image in a visually observable manner; and
a cover member movable between a closed portion where it covers said image receiving member and an opened position where it uncovers the image receiving member;
wherein said image receiving member moves along the optical axis in an interlinking relationship with movement of said cover member between the closed and open positions.

32. An image receiving device according to claim 31, further comprising guide means for guiding said cover member which it is being moved between the closed and open positions.

33. An image receiving device according to claim 32, wherein said guide means guides the cover member in a direction perpendicular to the optical axis.

34. An image receiving device according to claim 31, wherein said image receiving member moves away from the projection means along the optical axis in an interlinking relationship with movement of said cover member from the closed position to the opened position.

35. An image receiving device according to claim 34, wherein said image receiving member moves toward the projection means along the optical axis in an interlocking relationship with movement of said cover member from the opened position to the closed position.

36. An image receiving device according to claim 31, wherein said image receiving member has a diffusing member for diffusing the luminous flux.

37. An image receiving device according to claim 36, wherein said image receiving member further has a lens member for making the projected luminous flux into substantially parallel light, and wherein said lens member and diffusing member are provided integrally.

38. An image receiving device according to claim 37, wherein said diffusing member comprises a roughened surface of said lens member.

39. An image reading apparatus comprising:
projecting means for projecting an image;
a Fresnel lens for converting the projected image from said projecting means into an image having substantially parallel rays of light;
a lens array for forming an image of the image having parallel rays of light;
an image reading portion for receiving the image formed by the lens array; and
diffusing means disposed between said Fresnel lens and said lens array for diffusing the image having parallel rays of light at least in the direction of a longitudinal dimension of said lens array, the light diffused by said diffusing member being image-formed at the reading portion by said lens array, thereby carrying out reading of the original.

40. An image reading apparatus according to claim 39, wherein said diffusing means is disposed adjacent said Fresnel lens.

41. An image reading apparatus according to claim 39, wherein said diffusing means is disposed within the depth of field of said lens array.

42. An image reading apparatus according to claim 39, wherein said lens array is a short-focus image-forming element array.

43. An image reading apparatus according to claim 39, wherein the image reading portion comprises a line sensor.

44. An image reading apparatus, comprising:
a lens array for image-forming an original image on a reading portion;
a lens member for applying directivity to a projected luminous flux from an original;
a diffusing member for diffusing the projected luminous flux, said diffusing member being provided by roughing treating one surface of the lens member.

45. An image forming apparatus having a first operating mode wherein an original mounted on an original mounting plate is illuminated and light reflected from the illuminated original is read, and a second operating mode wherein an original not mounted on the original mounting plate is illuminated and light from the illuminated original is projected onto the original mounting plate and read, said apparatus comprising:
a lens array for image-forming an image information light on the image-forming portion;
a diffusing member for diffusing the luminous flux;
the image light diffused by said diffusing member being image-formed on the image-forming portion by said lens array in the second mode, thereby carrying out the image-forming corresponding to the original.

46. An image forming apparatus comprising:
a main body having a transparent original mounting member, said main body having an inside image-forming portion whereat an image of an original mounted either on the original mounting member or elsewhere is to be formed to be read, and a lens array for forming an image of the original at the image-forming portion; and
projection means for projecting light from an original not mounted on the original mounting member onto the original mounting member, said projection means having a lens member for imparting directivity to the projected light and diffusion means for diffusing the projected light;
the projected light diffused by said diffusing member being image-formed at the image-forming portion by said lens array, thereby carrying out the image-forming corresponding to the original.

47. An image forming apparatus which is capable of reading an image of a document mounted on a document mounting member as well as an image projected from a projection means, said apparatus comprising:
image receiving means having an image receiving member for receiving the projected image in a visually observable manner; and
a lens array for image-forming an image formation light on the image-forming portion;
the projected image received by said image receiving member being image-formed at the image-forming position by said lens array, and said image receiving means being used contacted with the original mounting member when the image forming corresponding to the original is carried out.

48. An image forming apparatus comprising:
projecting means for projecting an image;
a Fresnel lens for converting the projected image from said projecting means into an image having substantially parallel rays of light;
a lens array for forming the image having parallel rays of light;

an image-forming portion for receiving the image formed by the lens array; and diffusing means disposed between said Fresnel lens and said lens array for diffusing the image having parallel rays of light at least in the direction of a longitudinal dimension of said lens array;

light diffused by said diffusing member being image-formed at the image-forming portion by the lens array, thereby the image formation corresponding to the original being carried out.

49. An image forming apparatus, having a lens array for image-forming an original image on an image-forming portion;

a lens member for applying directivity to a projected luminous flux from an original;

a diffusing member for diffusing the projected luminous flux, said diffusing member being provided by making roughing treatment one surface of said lens member.

50. A projecting device for projecting an image onto a document mounting section of an image reading apparatus which is capable of reading a document mounted on said document mounting section, said device being detachably mounted at a predetermined position on said image reading apparatus, comprising:

a lens member, disposed upbeam of the document mounting section, for imparting directivity to a projected luminous flux; and a diffusing member, disposed downbeam of said lens member, for diffusing the projected luminous flux, said diffusing member being disposed on one surface of the lens member.

51. A projecting device according to claim 50, wherein said diffusing member is obtained by subjecting the one surface of said lens member to a surface-roughening treatment.

* * * * *

UNITED STATES PATENT AND TRADEMARK OFFICE
CERTIFICATE OF CORRECTION

PATENT NO. : 4,991,030

DATED : February 5, 1991

INVENTOR(S) : Hiroshi Sato, et al.

It is certified that error appears in the above-identified patent and that said Letters Patent is hereby corrected as shown below:

COLUMN 2:

Line 46, "field O" should read --field $\theta$--.

COLUMN 8:

Line 43, "On a" should read --One--.

Line 49, "fulcrum dowels 19a, 19b" should read --fulcrum dowels 419a, 419b--.

COLUMN 9:

Line 16, "image receiving plate 4" should read --image receiving plate 44--.

COLUMN 12:

Line 16, "tus FIGS. 28" should read --tus in FIGS. 28--.

COLUMN 14:

Line 68, "image portion;" should read --image reading portion;--.

UNITED STATES PATENT AND TRADEMARK OFFICE
CERTIFICATE OF CORRECTION

PATENT NO. : 4,991,030

DATED : February 5, 1991

INVENTOR(S) : Hiroshi Sato, et al.

It is certified that error appears in the above-identified patent and that said Letters Patent is hereby corrected as shown below:

COLUMN 15:

Line 66, "images-forming images" should read
        --image-forming image--.

COLUMN 16:

Line 19, "diffusing surface" should read
        --diffusing member--.

Line 26, "image receiving member" should read
        --said image receiving member--.

COLUMN 17:

Line 6, "portion" should read --position--.

Line 13, "open positions." should read
        --opened positions.--.

Line 16, "which it" should read --while it--.

Line 30, "locking" shuld read --linking--.

COLUMN 18:

Line 8, "original;" should read --original; and--.

Line 13, "original," should read --original--.

UNITED STATES PATENT AND TRADEMARK OFFICE
CERTIFICATE OF CORRECTION

PATENT NO. : 4,991,030

DATED : February 5, 1991

INVENTOR(S) : Hiroshi Sato, et al.

It is certified that error appears in the above-identified patent and that said Letters Patent is hereby corrected as shown below:

COLUMN 20:

Line 1, "treatment" should read --treatment of--.

Signed and Sealed this

Twenty-ninth Day of September, 1992

Attest:

DOUGLAS B. COMER

Attesting Officer    Acting Commissioner of Patents and Trademarks